US012726599B2

(12) United States Patent
Vieth

(10) Patent No.: US 12,726,599 B2
(45) Date of Patent: Sep. 1, 2026

(54) PARALLEL SPATIAL LIGHT MODULATOR MODULATORS

(71) Applicant: CHRISTIE DIGITAL SYSTEMS USA, INC., Cypress, CA (US)

(72) Inventor: Eric Vieth, Waterloo (CA)

(73) Assignee: CHRISTIE DIGITAL SYSTEMS USA, INC., Cypress, CA (US)

(*) Notice: Subject to any disclaimer, the term of this patent is extended or adjusted under 35 U.S.C. 154(b) by 300 days.

(21) Appl. No.: 18/403,806

(22) Filed: Jan. 4, 2024

(65) Prior Publication Data

US 2025/0227209 A1 Jul. 10, 2025

(51) Int. Cl.
*H04N 9/31* (2006.01)
*H04N 13/32* (2018.01)

(52) U.S. Cl.
CPC ........... *H04N 9/3158* (2013.01); *H04N 13/32* (2018.05)

(58) Field of Classification Search
CPC ........ G03B 21/00–64; G03B 33/00–16; H04N 9/31–3197; H04N 13/00–398; G02B 27/00–648; G02B 2027/0105–0198
See application file for complete search history.

(56) References Cited

U.S. PATENT DOCUMENTS

| | | | | |
|---|---|---|---|---|
| 6,309,072 | B1 | 10/2001 | Deter | |
| 8,077,196 | B2 | 12/2011 | Kao et al. | |
| 8,164,620 | B2 | 4/2012 | Hsu et al. | |
| 9,494,805 | B2 | 11/2016 | Ward et al. | |
| 2005/0036119 | A1* | 2/2005 | Ruda | G02B 17/02 353/99 |
| 2008/0158672 | A1 | 7/2008 | McCosky | |
| 2008/0192152 | A1* | 8/2008 | Facius | G03B 35/22 348/750 |
| 2009/0091709 | A1 | 4/2009 | Chien et al. | |
| 2013/0181973 | A1 | 7/2013 | Silverstein | |
| 2019/0011704 | A1* | 1/2019 | Jarvenpaa | G02B 27/283 |
| 2022/0214553 | A1 | 7/2022 | Guo et al. | |
| 2022/0244553 | A1 | 8/2022 | Arntsen et al. | |

FOREIGN PATENT DOCUMENTS

WO WO-2018086349 A1 5/2018

* cited by examiner

*Primary Examiner* — Christopher A Lamb, II
(74) *Attorney, Agent, or Firm* — PERRY + CURRIER INC.

(57) ABSTRACT

A 3D projector having two light modulators for modulating light from a single broadband light source, without loss of light being dumped into heat. In embodiments, light splitters (e.g. dichroic) are used to split one wavelength combination to one light modulator, and the other wavelength combination to the other light modulator, such that discarded spectrum from one modulator is used to illuminate the other modulator.

16 Claims, 2 Drawing Sheets

PARALLEL SPATIAL LIGHT MODULATOR MODULATORS

BACKGROUND OF THE INVENTION

1. Field of the Invention

The present invention is directed to projectors, and more particularly to a 3D projector having two light modulators for modulating light from a single broadband light source such that discarded light spectrum from one light modulator is used to illuminate the other light modulator.

2. Description of the Related Art

In wavelength multiplex displays, a projector projects specific wavelength combinations (e.g., left-eye RGB spectrum and right-eye RGB spectrum) from a light source onto a screen using a pair of spatial light modulators. 3D glasses with complementary dichroic filters in the lenses are worn by a viewer that filter out either one or the other set of the three light wavelengths. In this way a single projector can display the left and right stereoscopic images simultaneously.

Dual projector 3D systems are known for generating different wavelength combinations using RGB laser illumination. Systems are also known that use polarization modulation, although such systems work best only after the modulation phase because much of the glass does not maintain polarization.

In other systems, the two wavelength combinations can be created by filtering the broadband light using dichroic filters before the spatial light modulators. However, a problem with using broadband light to generate two visible spectrums for wavelength multiplexed 3D is that filtering before the spatial light modulators results in loss of light which is dumped into heat.

SUMMARY OF THE INVENTION

It is an aspect of the present invention to provide a 3D projector having two light modulators for modulating light from a single broadband light source, without loss of light being dumped into heat. In embodiments, light splitters (e.g. dichroic) are used to split one wavelength combination to one light modulator, and the other wavelength combination to the other light modulator, such that discarded spectrum from one modulator is used to illuminate the other modulator. This can result in an approximate doubling of efficiency over prior art 3D projection systems because each light modulator only modulates light that the other modulator is not modulating.

In some embodiments, both light modulators are disposed in a housing for receiving light from a common high etendue broadband light source.

The above aspects can be attained by a projector comprising: at least one broadband light source; a first light splitter configured to receive broadband light from the at least one broadband light source, reflect a first wavelength combination of the broadband light, and transmit a remaining wavelength combination different from the first wavelength combination; a second light splitter configured to receive the remaining wavelength combination of broadband light from the first light splitter, reflect a second wavelength combination of the remaining wavelength combination, and transmit a further remaining wavelength combination different from the first wavelength combination and second wavelength combination; a first light modulator for modulating the first wavelength combination of broadband light; a second light modulator for modulating the second wavelength combination of broadband light; first projection optics; and second projection optics, the first projection optics and the second projection optics configured to respectively project the first modulated light and the second modulated light.

In other aspects there is provided a projector comprising: at least one broadband light source; a first light splitter configured to receive broadband light from the at least one broadband light source, reflect a first wavelength combination of the broadband light, and transmit a remaining wavelength combination different from the first wavelength combination; a second light splitter configured to receive the remaining wavelength combination of broadband light from the first light splitter, reflect a second wavelength combination of the remaining wavelength combination, and transmit a further remaining wavelength combination different from the first wavelength combination and second wavelength combination; a first light modulator for modulating the first wavelength combination of broadband light; a second light modulator for modulating the second wavelength combination of broadband light; first projection optics; and second projection optics, the first projection optics and the second projection optics configured to respectively project the first modulated light and the second modulated light.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
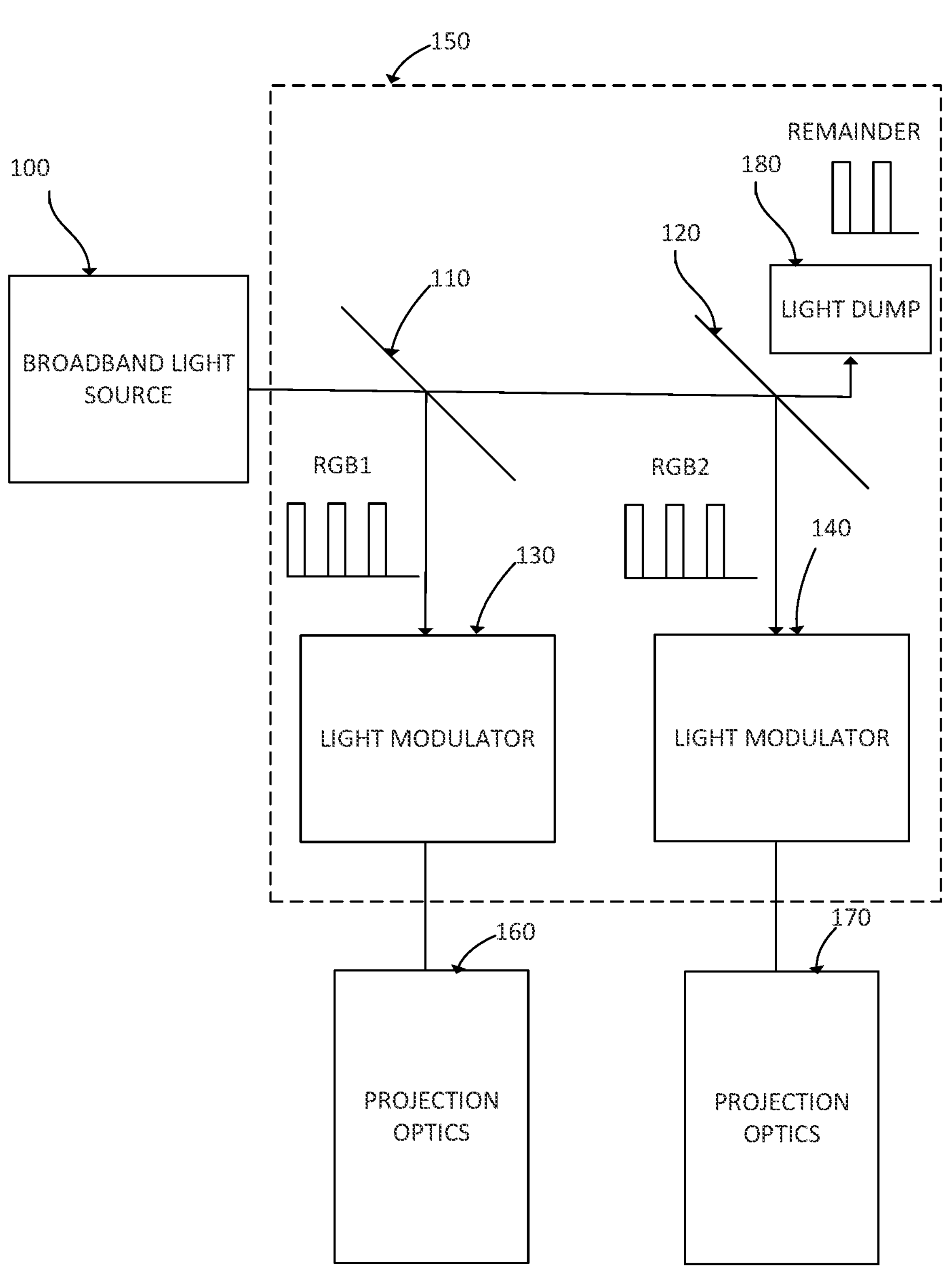
FIG. 1 is a block diagram of a projector according to an embodiment.

With reference to FIG. 1, a broadband light source 100 provides light to a parallel pair of light splitters 110, 120 and light modulators 130, 140 within a housing 150. Modulated light is transmitted to projection optics 160, 170 outside the housing 150.

In embodiments, multiple broadband light sources can be used, and broadband light source 100 can be a laser or a lamp, or multiple lasers or lamps. In embodiments, light splitters 110, 120 can be dichroic coatings, as is known in the art. Light modulators 130, 140 can be DMD, LCOS, DLP, transmissive LCD, diffractive or other suitable light modulators, as are known in the art. In some embodiments, broadband light source 100 can also be disposed within housing 150, although laser light sources normally do not need to be disposed in the housing because all of the light is from one etendue and if the laser light source is remote it cannot be included in housing 150 due to increased etendue and/or light scatter, etc.

In operation, broadband light source 100 projects white light onto the first light splitter 110. The first light splitter 110 transmits all but a first wavelength combination (e.g. RGB1) of the broadband light to the second light splitter 120, and reflects the first wavelength combination to the first light modulator 130 and projection optics 160. The second light splitter 120 receives the remaining light from splitter 110 and transmits all but a second wavelength combination (e.g. RGB2, a remaining wavelength combination different from the first wavelength combination) which is reflected to the second light modulator 140 and projection optics 170. The remaining light transmitted by second light splitter 120 can be collected by a light dump 180.

The first and second light modulators 130, 140 are controlled in tandem to form a 3D image. By illuminating the first and second light modulators 130, 140 from the same source, broadband light source 100, both light modulators have the same etendue.

By sharing light from one or more common sources, such as broadband light source 100, and operating the two light modulators 130, 140 in parallel within a single housing 150, the broadband light can be split into two different spectra and modulated independently by each of the modulators 130, 140.

Figure 2:
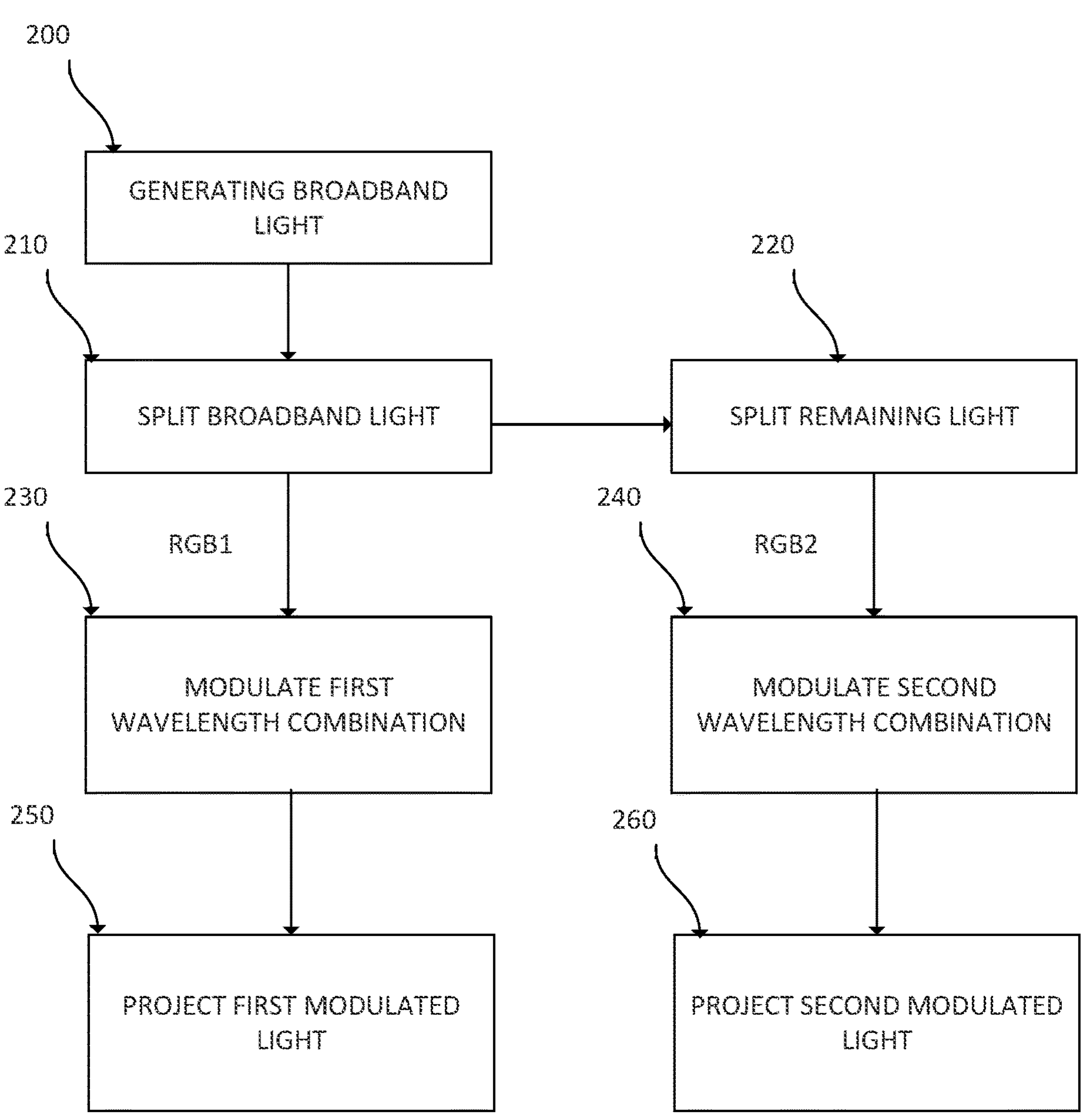
FIG. 2 is a flowchart showing a method according to an embodiment.

FIG. 2 shows an exemplary method of 3D projection, according to an embodiment, comprising generating broadband light 200; splitting the broadband light 210 so as to reflect the first wavelength combination of the broadband light (RGB1), and transmit the remaining wavelength combination different from the first wavelength combination. At 220, the remaining wavelength combination of broadband light is split so as to reflect the second wavelength combination of the remaining wavelength combination (RGB2), and transmit a further remaining wavelength combination different from the first wavelength combination and second wavelength combination, which can optionally be collected in a light dump. At 230, the first wavelength combination of broadband light is modulated. At 240, the second wavelength combination of broadband light is modulated. At 250, the first modulated light is projected, and at 260 the second modulated light is projected, such that the first modulated light and the second modulated light are projected in parallel to form a three-dimensional image.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A projector comprising:

at least one broadband light source;

a first light splitter configured to receive broadband light from the at least one broadband light source, reflect a first wavelength combination of the broadband light, and transmit a remaining wavelength combination different from the first wavelength combination;

a second light splitter configured to receive the remaining wavelength combination of broadband light from the first light splitter, reflect a second wavelength combination of the remaining wavelength combination, and transmit a further remaining wavelength combination different from the first wavelength combination and second wavelength combination;

a first light modulator for modulating the first wavelength combination of broadband light;

a second light modulator for modulating the second wavelength combination of broadband light;

first projection optics; and second projection optics, the first projection optics and the second projection optics configured to respectively project the first modulated light and the second modulated light, wherein the second light splitter comprises a second dichroic configured to: receive the remaining wavelength combination; reflect the second wavelength combination towards the second light modulator; and transmit the further remaining wavelength combination, different from the second wavelength combination.

2. The projector of claim 1, wherein the first light modulator and the second light modulator comprise respective digital micromirror devices (DMDs).

3. The projector of claim 1, wherein the first light modulator and the second light modulator comprise respective liquid crystal on silicon (LCOS) devices.

4. The projector of claim 1, wherein the first light modulator and the second light modulator comprise respective transmissive liquid crystal display devices.

5. The projector of claim 1, wherein the first light modulator and the second light modulator comprise respective diffractive light modulators.

6. The projector of claim 1, wherein the first light splitter comprises a first dichroic configured to: receive the broadband light; reflect the first wavelength combination towards the first light modulator; and transmit the remaining wavelength combination to the second light splitter.

7. The projector of claim 1, wherein the first wavelength combination comprises a first set of red, green and blue wavelengths, and the second wavelength combination comprises a second set of red, green and blue wavelengths.

8. The projector of claim 1, wherein the first projection optics and the second projection optics are configured to respectively project the first modulated light and the second modulated light in parallel.

9. The projector of claim 1, wherein the at least one broadband light source is a single broadband light source.

10. The projector of claim 1, wherein the at least one broadband light source is a plurality of broadband light sources.

11. The projector of claim 1, wherein the at least one broadband light source is external to the projector, and the projector further comprises one or more of an aperture and optics to receive the broadband light from the broadband light source.

12. The projector of claim 1, wherein the first modulated light and the second modulated light projected by the first projection optics and the second projection optics form a three-dimensional image.

13. The projector of claim 1, further comprising a light dump for collecting the further remaining wavelength combination transmitted by the second light splitter.

14. The projector of claim 1, wherein the first light splitter, second light splitter, first light modulator and second light modulator are disposed in a housing.

15. A method of 3D projection, comprising:

generating broadband light;

splitting the broadband light so as to reflect a first wavelength combination of the broadband light towards a first light modulator, and transmitting a remaining wavelength combination different from the first wavelength combination;

splitting the remaining wavelength combination of broadband light so as to reflect a second wavelength combination of the remaining wavelength combination, and transmitting a further remaining wavelength combination different from the first wavelength combination and second wavelength combination;

modulating the first wavelength combination of broadband light using the first light modulator;

modulating the second wavelength combination of broadband light using a second light modulator;

optically projecting the first modulated light; and optically projecting the second modulated light, wherein the first modulated light and the second modulated light are projected in parallel to form a three-dimensional image, wherein splitting the remaining wavelength combination comprises: receiving the remaining wavelength combination; reflecting the second wavelength combination towards the second light modulator; and transmitting the further remaining wavelength combination, different from the second wavelength combination.

16. The method of claim 15, wherein the first wavelength combination comprises a first set of red, green and blue wavelengths, and the second wavelength combination comprises a second set of red, green and blue wavelengths.

* * * * *